US007436413B2

(12) United States Patent
Kanai

(10) Patent No.: US 7,436,413 B2
(45) Date of Patent: Oct. 14, 2008

(54) IMAGE DATA PROCESSING APPARATUS AND IMAGE DISPLAY APPARATUS

(75) Inventor: Izumi Kanai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 11/080,626

(22) Filed: Mar. 16, 2005

(65) Prior Publication Data

US 2005/0206636 A1 Sep. 22, 2005

(30) Foreign Application Priority Data

Mar. 16, 2004 (JP) ............................ 2004-074633
Mar. 4, 2005 (JP) ............................ 2005-060108

(51) Int. Cl.
*G06T 15/00* (2006.01)

(52) U.S. Cl. ......................... 345/611; 345/606; 345/87; 315/76; 348/625; 341/144

(58) Field of Classification Search ................. 345/611, 345/606, 87, 88, 98; 315/371, 76; 348/625, 348/572, 745; 341/144, 150
See application file for complete search history.

(56) References Cited

U.S. PATENT DOCUMENTS

| | | | | |
|---|---|---|---|---|
| 6,750,839 | B1 * | 6/2004 | Hogan | 345/98 |
| 6,952,287 | B2 | 10/2005 | Aoki | 358/1.9 |
| 6,995,516 | B2 * | 2/2006 | Aoki et al. | 315/169.3 |
| 7,123,219 | B2 * | 10/2006 | Lee | 345/76 |
| 7,289,093 | B2 | 10/2007 | Uchiyama | 345/89 |
| 7,298,352 | B2 * | 11/2007 | Kang et al. | 345/87 |
| 7,312,776 | B2 * | 12/2007 | Bu | 345/88 |
| 2002/0195966 | A1 | 12/2002 | Aoki et al. | 315/169.3 |

FOREIGN PATENT DOCUMENTS

| | | |
|---|---|---|
| JP | 2000-122598 | 4/2000 |
| JP | 2001-343954 | 12/2001 |
| JP | 2001-350442 | 12/2001 |
| JP | 2001-357394 | 12/2001 |
| JP | 2002-108298 | 4/2002 |
| JP | 2003-173159 | 6/2003 |
| JP | 2005-157285 | 6/2005 |
| WO | WO 01/26085 A1 | 4/2001 |

* cited by examiner

*Primary Examiner*—Phu K Nguyen
(74) *Attorney, Agent, or Firm*—Fitzpatrick, Cella, Harper & Scinto

(57) ABSTRACT

The invention provides an image data processing apparatus including a memory for storing plural values indicating plural brightnesses when a predetermined display element is driven based on discrete plural drive values, and an operation circuit for converting a first conversion value converted from input image data, based on a value read out from the memory thereby generating the drive value, wherein the operation circuit executes an operation for evaluating a difference between the first conversion value and the value indicating brightness, and an operation for obtaining the drive value according to a result of the evaluation.

11 Claims, 8 Drawing Sheets

1st GRAY-LEVEL

2nd GRAY-LEVEL

3rd GRAY-LEVEL

128th GRAY-LEVEL

129th GRAY-LEVEL

130th GRAY-LEVEL

255th GRAY-LEVEL

IMAGE DATA PROCESSING APPARATUS AND IMAGE DISPLAY APPARATUS

BACKGROUND OF THE INVENTION

1. Field of the Invention

The present invention relates to an image data processing apparatus and an image display apparatus.

2. Related Background Art

In an image display apparatus, in order to improve the quality of the displayed image, there is already known a technology of correcting an unevenness in luminance, generated for each pixel (for example, Japanese Patent Application Laid-Open Nos. 2000-122598, 2001-357394 and 2001-350442). A distribution of a luminance unevenness generated in each pixel may also vary by a gray-level to be displayed. Therefore, it is desired to appropriately correct the unevenness in luminance according a change in the gray-level. The Japanese Patent Application Laid-Open No. 2000-122598 discloses a technology of correcting the unevenness in luminance according to the change in the gray-level.

Such technology disclosed in Japanese Patent Application Laid-Open No. 2000-122598 will be explained briefly. In such technology, a table defining correction values for all the gray-levels is stored in a memory (storage means) for all the pixels, and input image data are multiplied by a correction value corresponding to such image data (more specifically a correction value (a reciprocal of a luminance when a light emission is executed with a predetermined luminance instruction value) is multiplied as a gain on a light emission instruction value) thereby causing a light emission with an appropriate gray-level. This technology allows to appropriately correct the unevenness in luminance even when the gray-level changes.

However, in the technology disclosed in Japanese Patent Application Laid-Open No. 2000-122598, it is required to store, for all the pixels, a table defining correction values for all the gray-levels in the memory. Therefore the memory requires an enlarged capacity so that the magnitude of the circuit becomes larger.

Also Japanese Patent Application Laid-Open No. 2001-357394 discloses a technology of interpolating correction data to be added to the input signal. In general, an interpolation technology can reduce the memory capacity as the data amount to be stored in the memory can be reduced.

SUMMARY OF THE INVENTION

The present invention in an aspect provides a following image data process apparatus:

An image data processing apparatus including:

a memory for storing plural values indicating brightnesses when a predetermined display element is driven based on discrete plural drive values; and an operation circuit for converting a first conversion value converted from input image data, based on a value read out from the memory thereby generating the drive value;

wherein the operation circuit executes an operation for evaluating a difference between the first conversion value and the value indicating brightness, and an operation for obtaining the drive value according to a result of the evaluation.

As the operation circuit executes an operation for obtaining the drive value corresponding to the result of the evaluation, there can be employed, as the first conversion value, various values capable of providing a drive value corresponding to a difference from the value indicating brightness. As an object of evaluation of difference is value indicating brightnesses, a preferred embodiment can employ, as the first conversion value, a value indicating a target brightness to be displayed. The above-mentioned discrete plural drive values are a part of possible drive values (continuous drive values for example from 0 to 255). In case a non-linearity exists in the relationship of the drive value and the brightness between two adjacent drive values among such discrete plural drive values, a value of a target display bright subjected to a correction for relaxing such non-linearity may be employed as the first conversion value. Also the value indicating brightnesses can be obtained by actually measuring the brightness. The brightness specifically means a luminance in a narrower sense or a luminance in a narrower sense integrated over a predetermined period. In case the display apparatus executes a pulse width modulation with a constant amplitude, the luminance in the narrower sense is constant while the brightness is modulated, and, in such case, a value obtained by integrating the luminance of narrower sense over a predetermined period is used as the brightness. The integrating period can be so selected that the brightness can be evaluated, and there can be employed a period in which an element can emit light for forming an image (preferably a horizontal scan period, or, a vertical scan period in case of considering afterglow characteristics). As will be apparent from the foregoing, the luminance of narrower sense or the integrated luminance of narrower sense can be similarly processed as the brightness, so that the luminance used in the present specification includes a case where the actually measured brightness is an integrated value of the luminance in the narrower sense. Also as the values indicating brightnesses, there can be employed not only a measured value of the luminance in the narrower sense or of the integrated value of the luminance in the narrower sense, but also a value obtained by applying a predetermined operation, such as a multiplication of a constant, on the measured value. In case of employing a value obtained by applying such predetermined operation on the brightness as the values indicating brightnesses, it is preferable to employ, as the first conversion value, a value obtained by applying such predetermined operation on the target brightness, in order to obtain a drive value corresponding to a difference to the aforementioned value (namely in order to execute a comparison on a same scale).

Also the operation circuit can advantageously employ a configuration which calculates the drive value by an interior division based on the result of the aforementioned evaluation.

Also there can be adopted a configuration where the memory is to store plural values indicating brightnesses when each of plural display elements is driven based on discrete plural drive values, in respective correspondence with each of such plural display elements; and the operation circuit converts the first conversion value converted from the input image data, based on a value stored in the memory in correspondence with the display element corresponding to such input image data, thereby generating the aforementioned drive value.

The memory is not required to store values corresponding to the display luminances for all the display elements contained in a display unit. For example, in case plural values corresponding to the display luminances are same or only negligibly different for two display elements, it is not necessary to store the information respectively for such two display elements.

Also there can be advantageously employed a configuration where the first conversion values are obtained by converting input image data respectively corresponding to the plural display elements by a conversion process having common conversion characteristics.

The present invention in another aspect provides a following image data processing apparatus:

An image data processing apparatus including:

an operation circuit for converting a first conversion value, converted from input image data into values indicating brightnesses, thereby generating a drive value; and a memory for storing plural values indicating brightnesses when a predetermined display element is driven based on discrete plural drive values, and an operation parameter to be used in the operation circuit for converting the first conversion value between two adjacent values among the plural values indicating brightnesses;

wherein the operation circuit generates the drive value utilizing the first conversion value, the values indicating brightness and the operation parameter.

There can be advantageously adopted a configuration where the operation parameter is a value determined by a predetermined drive value and the value indicating brightness when the predetermined display element is driven with the predetermined drive value.

Also there can be advantageously adopted a configuration where the memory is to store plural values indicating brightnesses when each of plural display elements is driven based on discrete plural drive values, in respective correspondence with each of such plural display elements, and the operation parameter corresponding to each of the plural display elements; and the operation circuit converts the first conversion value converted from the input image data, based on the values indicating brightnesses stored in the memory and the operation parameter, in correspondence with the display element corresponding to the input image data, thereby generating the aforementioned drive value.

Also there can be advantageously employed a configuration where the first conversion values are obtained by converting input image data respectively corresponding to the plural display elements by a conversion process having common conversion characteristics.

The present invention provides in another aspect a following image data processing apparatus:

An image data processing apparatus including:

an operation circuit for converting a first conversion value, converted from input image data into a value indicating brightness, thereby generating a drive value; and a memory for storing an operation parameter to be used in the operation circuit for converting the first conversion value;

wherein the operation parameter is a value determined by a predetermined drive value and a value indicating brightness when the predetermined display element is driven with the predetermined drive value; and the operation circuit generates the drive value utilizing the first conversion value and the operation parameter.

There can be advantageously adopted a configuration where the memory is to store the operation parameter corresponding to each of plural display elements; and the operation circuit converts the first conversion value converted from the input image data, based on the operation parameter stored in the memory, in correspondence with the display element corresponding to the input image data, thereby generating the aforementioned drive value.

Also there can be advantageously employed a configuration where the first conversion values are obtained by converting input image data respectively corresponding to the plural display elements by a conversion process having common conversion characteristics.

In the aforementioned aspects, there can be advantageously adopted a configuration where the image data processing apparatus includes a circuit for executing a conversion for obtaining the first conversion value. Also a table for obtaining the first conversion value from the input image data can be advantageously employed as such circuit. Also instead of employing a table, the first conversion value may be obtained by an operation utilizing the input image data and a conversion parameter.

The present invention also provides an image display apparatus including a display unit having display elements, an image data processing apparatus explained in the foregoing, and a modulator for generating a drive pulse for driving the display element based on a drive value outputted by the image data processing apparatus.

DESCRIPTION OF THE PREFERRED EMBODIMENTS

In order to realize an appropriate image display, the present inventors have investigated a configuration of obtaining a correction value by interpolation, but have found that such interpolation of correction valu is associated with following drawbacks.

Figure 12A:
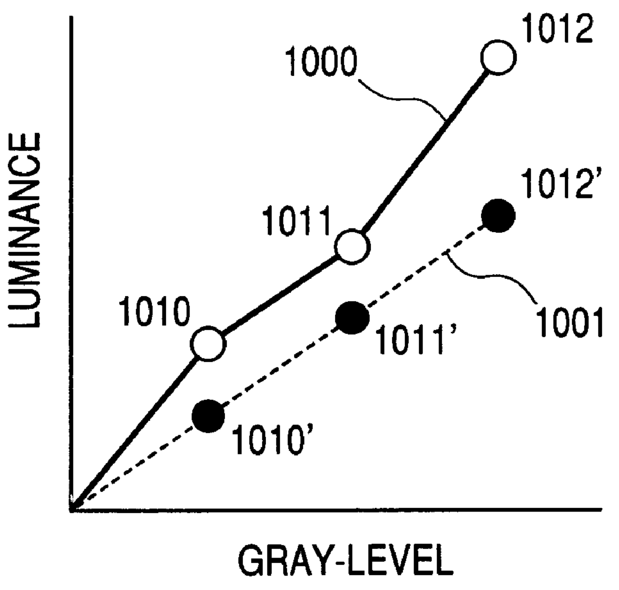
FIGS. 12A and 12B are views showing problems encountered when a correction value is interpolated.
Figure 12B:
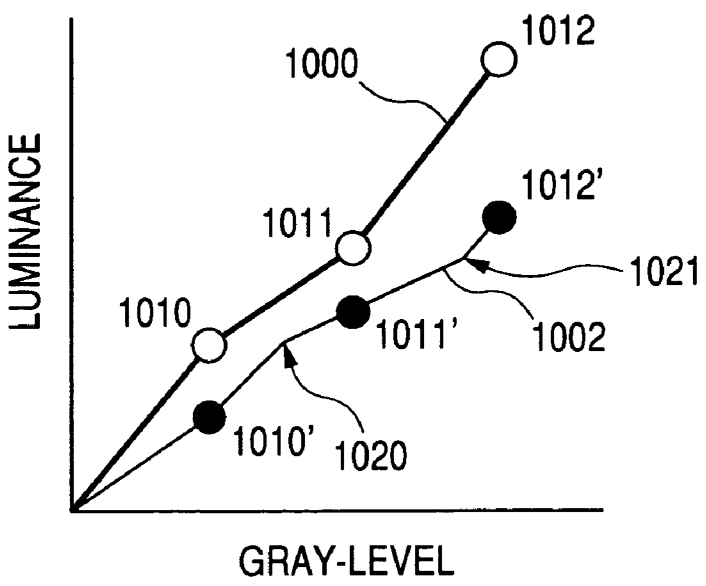

FIGS. 12A and 12B are charts illustrating drawbacks encountered in an interpolation of a correction value. In these charts, the abscissa indicates a gray-level, and the ordinate indicates a luminance. An articulated line 1000 indicates gamma characteristics (hereinafter called γ-curve) in a certain pixel. Usually the γ-curve varies depending on the pixel.

For correcting an unevenness in the luminance, luminances are measured at three points 1010, 1011, 1012 in FIG. 12A, and correction values are determined at these three points. The three points 1010, 1011 and 1012 represent discrete gradations levels. In case of input image data of 8 bits, there can be assumed, for example, a set of gray-levels of 85, 170 and 255.

A γ-curve which all the pixels within an image field should have after the correction of unevenness in the luminance is called a target γ-curve. In case the γ-curves of all the pixels match the target γ-curve, an unevenness in the luminance is not generated even when the gradation changes. In FIG. 12A, a target γ-curve is indicated by 1001.

Correction values at the three points 1010, 1011, 1012 are such values as to correct these three points to points 1010', 1011', 1012' on the target γ-curve. Therefore, the measured three points are so corrected as to exactly display the desired luminances. On the other hand, for a gray-level other than those of the measured three points, a correction value is determined by a linear interpolation of the correction values of three points. A correction value obtained by such interpolation is added to the input gradation value. In this manner, correction values can be obtained for all the gradation values, even without a table having such correction values for all the gray-levels.

However, in such correction, the γ-curve in an interpolated portion does not necessarily match the target γ-curve. This situation will be explained in the following. In FIG. 12B, a γ-curve after a correction is indicated by 1002. Three points where the luminance is measured are exactly on the target γ-curve, but the characteristic curve is distorted in other gray-levels and does not match the target γ-curve. Also bend points are generated as indicated by 1020, 1021 in FIG. 12B. These points remain from a bend point in the γ-curve 1000 before the correction and a bend point in the linear interpolation for determining the correction value.

Thus, in case an interpolation is employed in obtaining the correction value for reducing the memory capacity, there results a drawback that the interpolated gradation value does not match the target γ-curve so that an appropriate correction cannot be executed.

In the following, there will be explained embodiments of the present invention, capable of solving such drawback.

In the following, preferred embodiments of the present invention will be explained by examples with reference to the accompanying drawings. However, in these examples, a dimension, a material, a shape, a relative position and the like of a component should not be construed to limit the range of the invention to such descriptions, unless specified otherwise.

EXAMPLE 1

Figure 1:
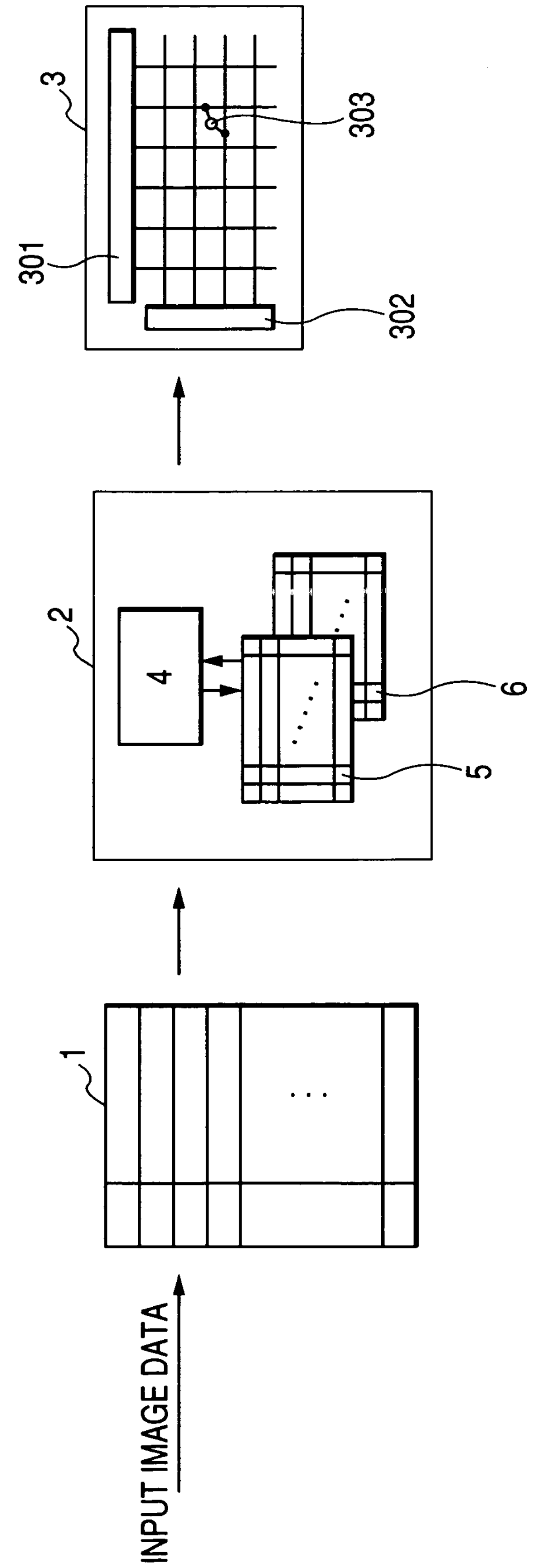
FIG. 1 is a circuit block diagram of an image display apparatus in an example 1 of the present invention.
Figure 2:
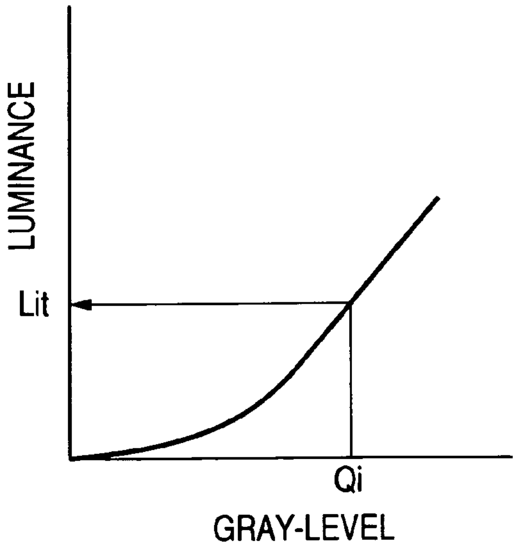
FIG. 2 is a target γ-curve in the example 1 of the present invention.
Figure 3:
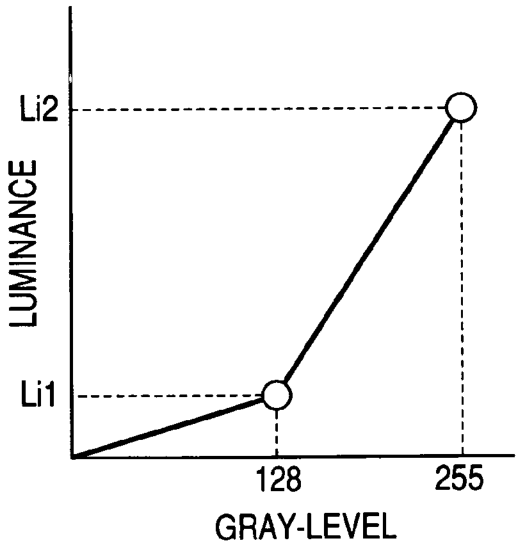
FIG. 3 is a γ-curve in a pixel in the example 1 of the present invention.
Figure 4:
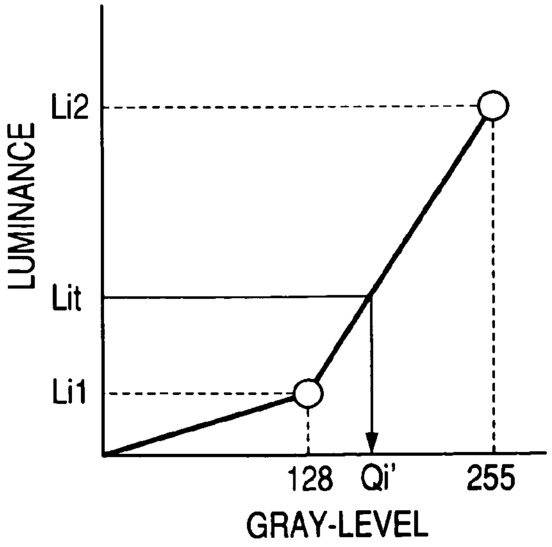
FIG. 4 is a schematic view for explaining an operation method for obtaining a gradation value to be displayed in the image display apparatus in an example 1 of the present invention.

An image display apparatus constituting an example 1 of the present invention will be explained with reference to FIGS. 1 to 4. FIG. 1 is a circuit block diagram of an image display apparatus in an example 1 of the present invention; FIG. 2 is a target γ-curve in the example 1 of the present invention; FIG. 3 is a γ-curve in a pixel in the example 1 of the present invention; and FIG. 4 is a schematic view for explaining an operation method for obtaining a gradation value to be displayed in the image display apparatus in the example 1 of the present invention.

Referring to FIG. 1, there are shown a target γ-table 1, a conversion portion 2 serving as a conversion circuit, a display panel 3 serving as a display portion, an operation unit 4, and luminance tables 5, 6. The display panel is provided with a modulator 301, a scanning circuit 302, and display elements 303. The display element is so wired as to enable a matrix drive, and is driven by a selection signal outputted by the scanning circuit 302 and a modulation drive pulse outputted by the modulator thereby providing a luminance corresponding to the drive pulse.

Input image data, as a digital signal, are entered into a target γ-table 1 and converted into luminance data. Such luminance data are called a target luminance value. The input image data have, for example, a value of a power of (1/2.2) of the luminance, and the data after the conversion are linear to the luminance.

In the present example, a γ-curve which all the pixels (display elements) within the image should have in common is called a target γ-curve. The target γ-table 1 stores such target γ-curve (cf. FIG. 2). The target γ-curve in the present example has a property: luminance $\propto$ $(\text{gradation})^{2.2}$.

For example, when image data Qi for a pixel i are entered, such data are converted by the target γ-table 1 into a target luminance value Lit. This conversion is executed by conversion characteristics common to the image data corresponding to all the display elements, thereby providing a first conversion value. The first conversion value indicates a target brightness.

Then a conversion portion 2 further converts the first conversion value to determine gradation data Qi' which are a drive value for displaying the target luminance value Qit. Details of this conversion will be explained later. Based on the gradation data Qi', the pixel i emits light with a desired luminance Lit. More specifically, the gradation data are supplied to the modulator for generating a drive pulse of a shape corresponding to the gradation data, and such drive pulse is applied to the display element to obtain a brightness (luminance) corresponding to the gradation data. In the shape of the drive pulse, a wave height and a pulse width are determined according to the gradation data. As already explained before, the luminance used herein means a value indicating a brightness, and, in case the pulse width is modulated according to the gradation data, the brightness corresponds to a time-integrated value of the luminance, but the luminance used herein also includes such time-integrated value of the luminance.

FIG. 3 shows a γ-curve of a certain pixel i before the correction of unevenness in the luminance. Each pixel in the image display apparatus of the present example is assumed to have, with a highest gray-level at 255, articulate-lined γ-characteristics having a bend point at a gray-level 128 as shown in FIG. 3. The pixel i has characteristics of light emission, in case the correction for the unevenness in luminance is not executed, of providing a luminance Li1 at a gray-level 128 and a luminance Li2 at a gray-level 255. Also the pixel i has characteristics of linearly changing the luminance in the gradation range of 0 to 128 and in the gradation range of 128 to 255. Therefore, a characteristic curve shown with the gradation data in the abscissa and the luminance in the ordinate has a bend point at a gray-level 128.

Figure 13A:
FIGS. 13A, 13B, 13C, 13D, 13E, 13F and 13G are views showing shapes of drive pulses employed in the examples.
Figure 13B:
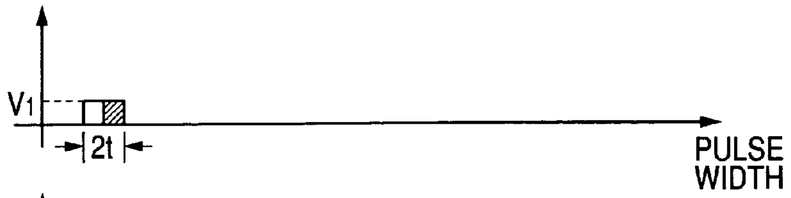
Figure 13C:
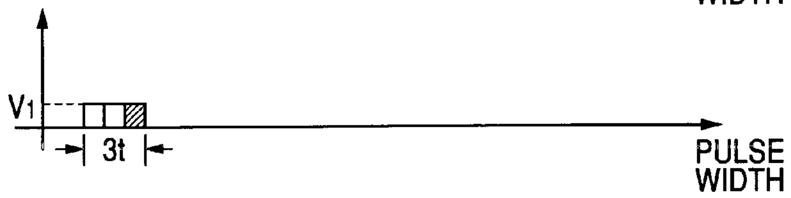
Figure 13D:
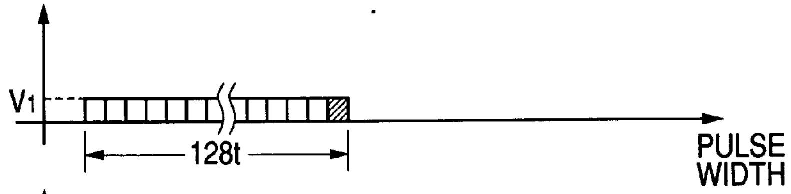
Figure 13E:
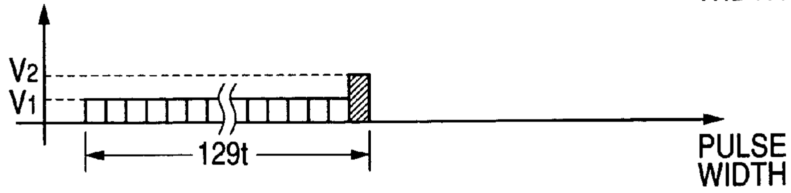
Figure 13F:
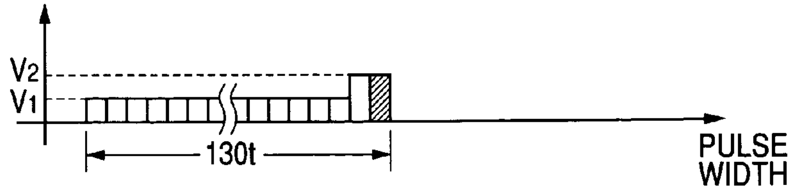
Figure 13G:
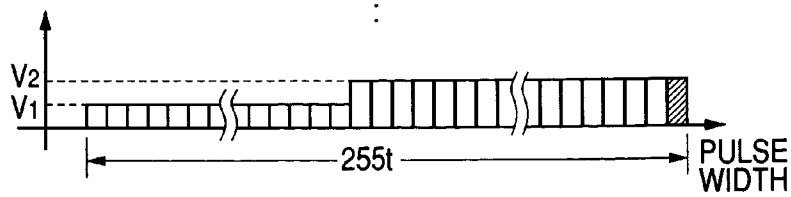

Shapes of the drive pulse employed in the present embodiment are shown in FIGS. 13A to 13G, corresponding to different gradation data. The drive pulse is not outputted for gradation data of a gray-level 0. For the gradation data of a gray-level 1, there is outputted a drive pulse as shown in FIG. 13A, having a wave height of a voltage V1 and a pulse width t. For the gradation data of a gray-level 2, there is outputted a drive pulse as shown in FIG. 13B, having a wave height of a voltage V1 and a pulse width 2t, which is increased by t in comparison with the gray-level 1. Up to a gray-level 128, the pulse width is increased by t corresponding to a step increase of the gray-level. In the drawings, a hatched area indicates a portion different in pulse shape, in comparison with that in one lower gray-level. For the gradation data of a gray-level 129, the drive pulse has, as shown in FIG. 13E, a shape of a wave height V1 in a front portion of 128*t* to which a portion (hatched portion) of a wave height V2 and a pulse width t is attached. Then, up to a gray-level 255, the portion of the wave-height V2 is increased by t corresponding to a step increase of the gray-level. In case of employing such drive pulse, the luminance increases in succession, within the gradation range of 0 to 128, with a unit of luminance obtained by a pulse of a wave height V1 and a pulse width t. Also within the gradation range of 128 to 255, the luminance increases in succession with a unit of luminance obtained by a pulse of a wave height V2 and a pulse width t. These relations are shown in FIG. 3 in which a bend point is generated at the gray-level 128. A driving wave form, which divides the range of the gradation data into plural gradation ranges and in which the characteristic line showing the relationship between the gradation data and the luminance has a bend point between such gradation range, is not limited to the form of the present example as shown in FIGS. 13A to 13G but other forms are also possible. For example Japanese Patent Application Laid-Open No. 2003-173159 discloses, in FIG. 21 thereof, a configuration of extending the pulse width of a unit drive block with an increase in the gray-level, for each gradation range, and such drive pulse is also usable.

The target luminance value outputted from the target γ-table 1 is entered into the conversion portion 2. The conversion portion 2 has an operation portion 4 and luminance tables 5, 6 as a memory. The luminance tables 5, 6 store display luminances in all the pixels within the image area, before the correction of the unevenness in luminance, as values indicating brightnesses. The tables store actual luminances, realized by driving each display element constituting each pixel with plural drive values (two gradation values 128 and 255 in the present case), in correspondence with each display element. The value indicating brightness may also be a value obtained by multiplying the luminance with a constant. The luminance table 5 stores luminance data when a gray-level 128 is inputted into the modulator and displayed, while the luminance table 6 stores luminance data when a gray-level 255 is inputted into the modulator and displayed. The luminance table 5 stores Li1 in a position corresponding to the pixel i, and the luminance table 6 stores Li2 in a position corresponding to the pixel i.

Such luminance data may for example be obtained by a luminance measurement in a manufacturing step and written into the luminance tables. The luminance measurement may be executed at both gray-levels 128 and 255, or may be executed at a gray-level 255 only while the luminance at the gray-level 128 may be estimated from that at the gray-level 255, or, inversely the luminance measurement may be executed at a gray-level 128 only while the luminance at the gray-level 255 may be estimated from that at the gray-level 128.

An operation portion 4 utilizes the luminance tables 5, 6 on the target luminance value to derive a gray-level to be displayed and outputs gradation data to the display panel 3. More specifically, the operation portion 4 at first reads, from the luminance tables 5, 6 luminance data of a pixel corresponding to the input target luminance value. For example, when a target luminance value Lit of a pixel i is inputted, luminance data Li1, Li2 of the pixel i are read respectively from the luminance tables 5, 6.

In the following, there will be explained a process executed by the operation portion 4 for calculating the gradation data, taking an example of a pixel i. Also display gradation data as drive values are similarly determined also for all the pixels other than the pixel i.

The operation portion 4 compares the target luminance value Lit with luminance data Li1, Li2, and executes following processes according to a result of such comparison.

(1) Case of Lit≧Li2:

The operation portion 4 outputs 255 as gradation data, as indicated by a following equation:

$$\text{display gradation } Qi'=255 \tag{1}$$

In case the target luminance value Lit is higher than the maximum luminance of the pixel i (luminance obtained by inputting a gray-level 255), the luminance of the pixel i cannot attain the target luminance value.

(2) Case of Li2>Lit≧Li1:

The operation portion 4 outputs, as gradation data, a value obtained by an interior division of the gradations levels 128 and 255 with a luminance ratio. More specifically the display gradation is determined by a following equation:

$$\text{gray-level } Qi'=\{128\times(Li1-Li2)+255\times(Lit-Li1)\}/(Li2-Li1) \tag{2}$$

FIG. 4 shows a method of determination of the gradation Qi'. Qi is a point obtained by an interior division of the gray-levels 128 and 255 with a ratio (Li2−Lit):(Lit−Li1).

(3) Case of Li1>Lit≧0:

The operation portion 4 outputs, as gradation data, a value obtained by an interior division of the gradations levels 0 and 128with a luminance ratio. More specifically the display gradation is determined by a following equation:

$$\text{gray-level } Qi'=128\times Lit/Li1 \tag{3}$$

In this manner, the conversion portion 2 determines a gradation to be displayed by an interior division (interpolation) and outputs such gradation to a driving portion of the display panel.

The display panel 3, serving as a display portion, is driven by the gradation data determined in the conversion portion 2 as a drive value, and each pixel of the display panel 3 displays a target luminance value. In this manner there can be displayed an image corrected for the unevenness in the luminance.

In this example, the luminance measurement is executed at two gray-levels 128 and 255. In case the γ-curve have a larger number of bend points, it is possible to increase the gray-levels at which the luminance measurement is executed, and to determined a gradation between the measured gray-levels by an interior division operation as in the above-described method.

In the invention, as explained in the foregoing, it is not required to store the correction values corresponding to all the gray-levels for all the pixels, so that the data amount to be stored in the memory can be reduced. Also the γ-curve after the correction does not show unnecessary remaining bend point and characteristics matching the target γ-curve can be obtained. It is thus rendered possible to appropriate correct the unevenness in the luminance even when the gradation changes, thereby allowing to display an image of a high quality.

EXAMPLE 2

Now an example 2 of the present invention will be explained with reference to FIGS. 5 to 7A and 7B. The present example explains a case where a γ-curve of a pixel has saturation characteristics. Example 1 shows a case in which, within a predetermined gradation range, namely within a range from gray-level 0 to 128 or from gray-level 128 to 255, the luminance increases linearly with an increase in the gradation value. On the other hand, the present example shows a case where, even within a gradation range divided by bend points, a non-linearity exists between the gradation and the luminance. For example, such non-linearity may arise in case the display element has a structure of emitting light by irradiating a phosphor with electrons from an electron emitting device and an amount of the irradiating electrons causes a saturation in the light emission of the phosphor. The present example realizes an appropriate correction of the unevenness in luminance in such structure.

Figure 5:
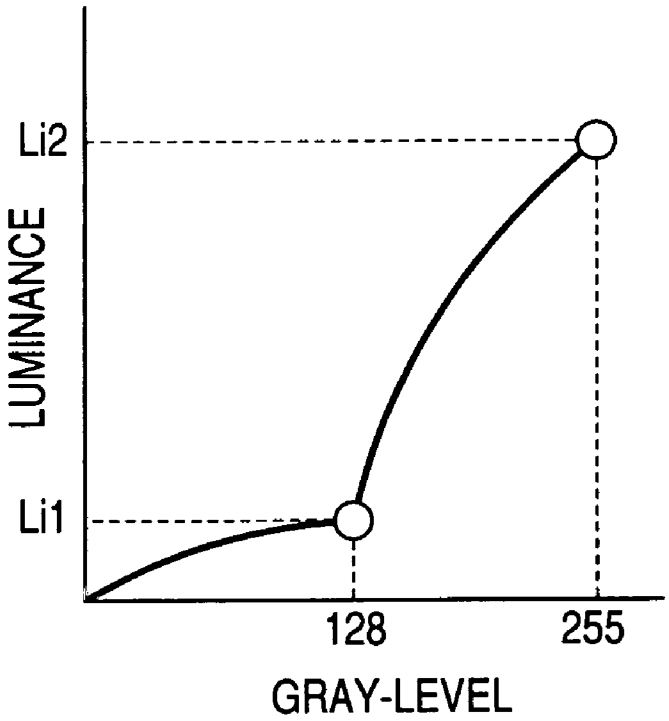
FIG. 5 is a γ-curve in a pixel i in an example 2 of the present invention.
Figure 6:
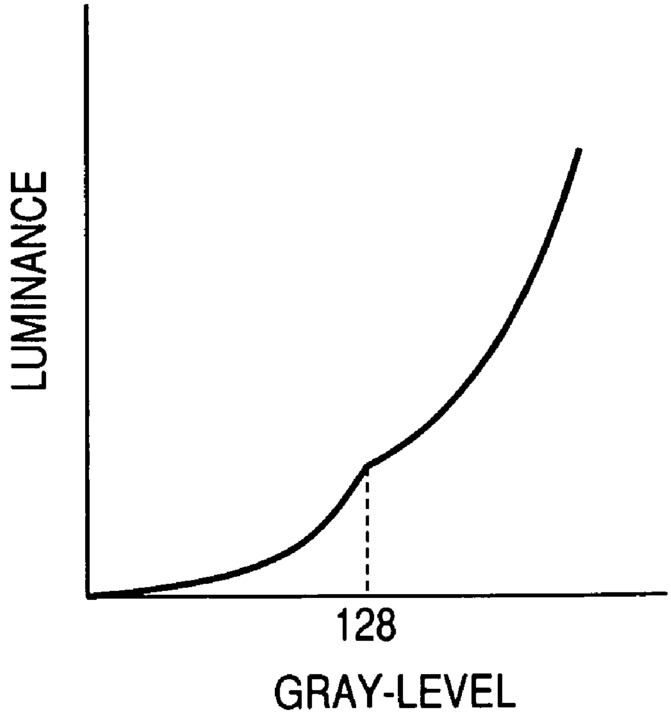
FIG. 6 is a target γ-curve in the example 2 of the present invention.
Figure 7A:
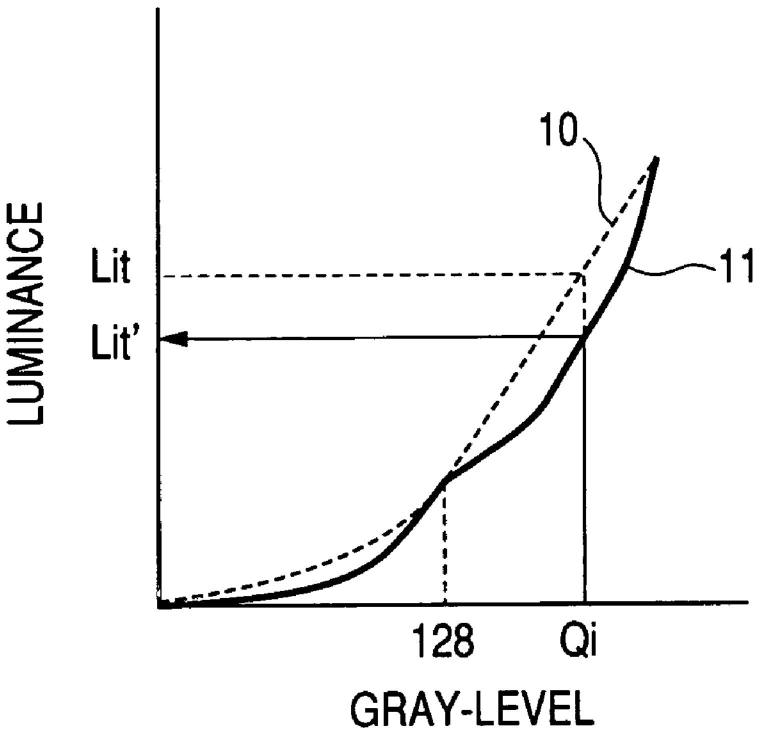
FIGS. 7A and 7B are schematic views for explaining an operation method for obtaining a gradation value to be displayed in the image display apparatus in the example 2 of the present invention.
Figure 7B:
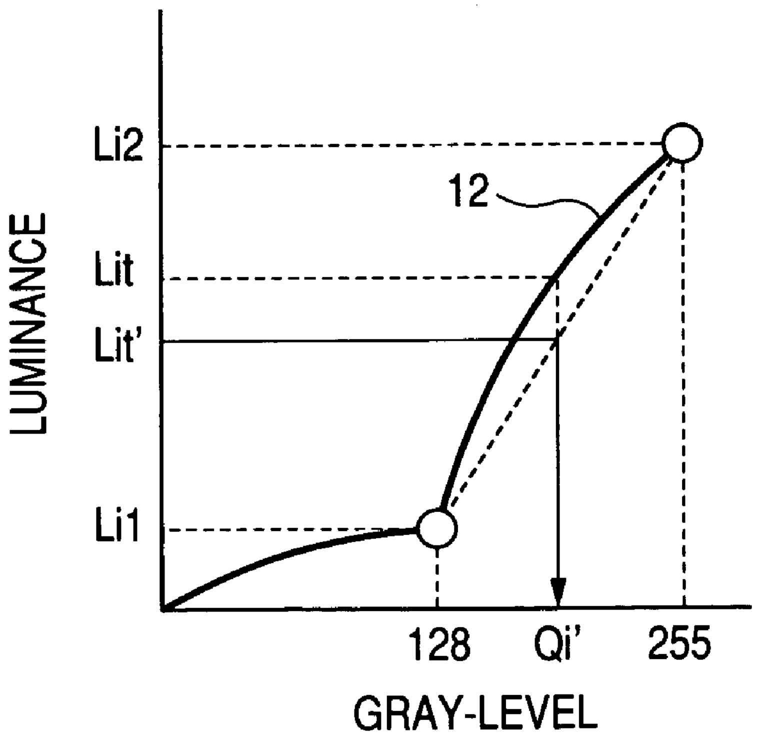

FIG. 5 is a γ-curve in a certain pixel i in the example 2 of the present invention; FIG. 6 is a target γ-curve in the example 2 of the present invention; and FIGS. 7A and 7B are schematic views for explaining an operation method for obtaining a gradation value to be displayed in the image display apparatus in the example 2 of the present invention.

In the present example, as shown in FIG. 5, the γ-curve of a pixel has a bend point at a gray-level 128, while the γ-curve has luminance saturation characteristics, convex to the above, within ranges of the gray-levels 0 to 128 and 128 to 255.

An image display apparatus of the present example has a basic configuration same as that of Example 1, as shown in FIG. 1. However, the target γ-table 1 stores a target γ-curve different from that of Example 1. In contrast to the target γ-curve of Example 1 having γ=2.2 as shown in FIG. 2, the target γ-curve of the present example has a form shown in FIG. 6. More specifically, it has a bend point at a gray-level 128, and is formed as a curve convex to below in the gradation ranges of 0 to 128 and 128 to 255 in order to cancel the saturation characteristics.

In such configuration, the output of the target γ-table 1 is processed in the same manner as in Example 1 to obtain an appropriate display gradation in which the saturation characteristics are cancelled.

Figure 11:
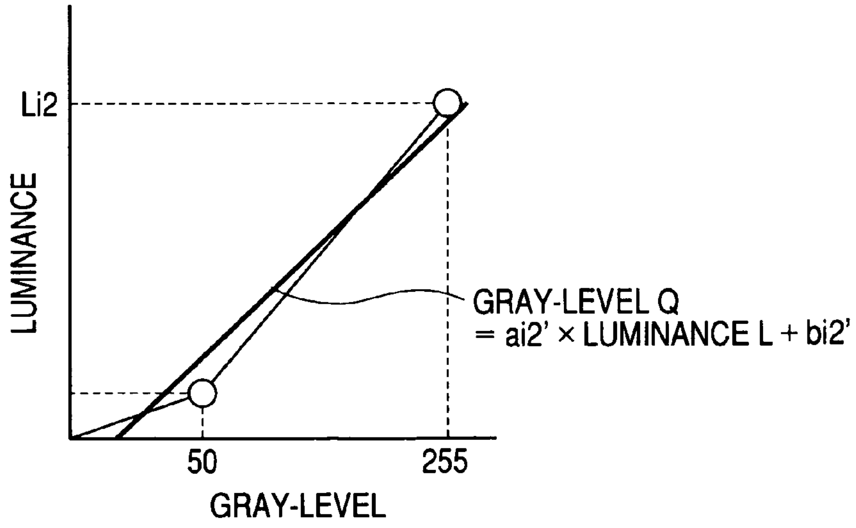
FIG. 11 is a schematic view for explaining an operation method for obtaining a gradation value to be displayed in the image display apparatus in an example 4 of the present invention.

FIGS. 7A and 7B show a process sequence in case Qi is inputted as input image data of a certain pixel i. In FIG. 7A, 11 indicates a target γ-curve of the present example, and 10 indicates a curve of γ=2.2, same as in FIG. 2. In response to the input of the image data Qi, there is outputted a value Lit' corrected for the non-linearity between the gradation data of the target luminance value outputted by the operation portion 2 utilizing the target γ-table 1, namely the γ-curve 11 and the actually displayed luminance. A true luminance value to be displayed is Lit converted by the curve 10, but, in the present example, in order to cancel the saturation characteristics with the target γ-table, there is outputted Lit' (target luminance value corrected for canceling the saturation) different from the true display luminance value.

The corrected target luminance value Lit' is entered into the conversion portion 2 and the gradation data are determined by a calculation similar to Example 1. When the corrected target luminance value Lit' is entered into the conversion portion 2, the gradation data Qi' are determined by an interior division as shown in FIG. 7B.

In FIG. 7B, 12 indicates a γ-curve of a pixel i. When the gradation data Qi' are displayed on the pixel i, the actually displayed luminance is not Lit' because of the saturation characteristics and a desired luminance Lit is displayed.

As explained in the foregoing, the present example allow to attain an appropriate correction of the unevenness in luminance, even when the γ-curve has saturation characteristics.

EXAMPLE 3

Figure 8:
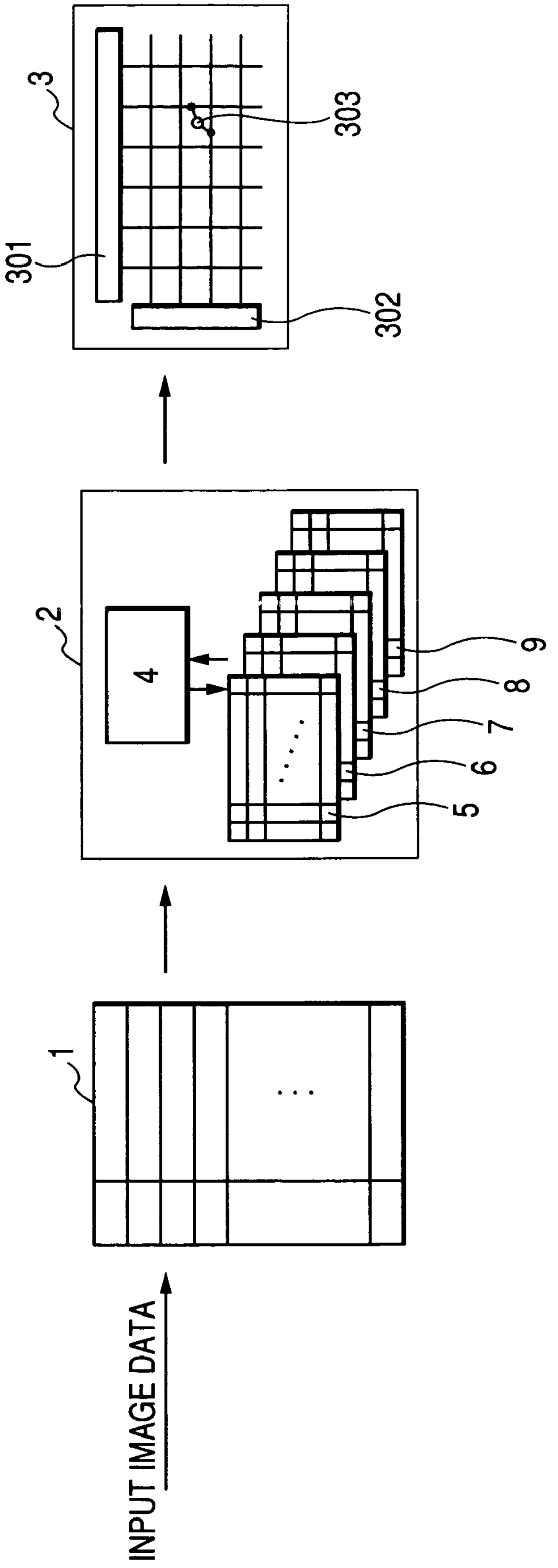
FIG. 8 is a circuit block diagram of an image display apparatus in an example 3 of the present invention.
Figure 9:
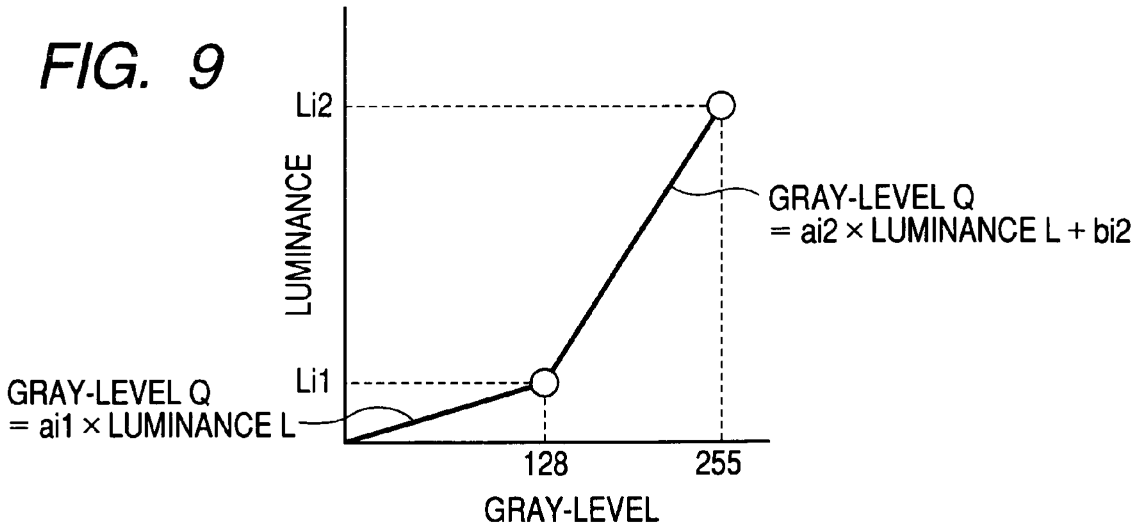
FIG. 9 is a schematic view for explaining an operation method for obtaining a gradation value to be displayed in the image display apparatus in an example 3 of the present invention.

In the following, an image display apparatus of an example 3 of the present invention will be explained with reference to FIGS. 8 and 9. FIG. 8 is a circuit block diagram of an image display apparatus in the example 3, and FIG. 9 is a schematic view for explaining an operation method for obtaining a gradation value to be displayed in the image display apparatus in the example 3. The example 3 is similar in configuration to Example 1, but is different in that the conversion portion 2 have five tables 5 to 9, and that a process in the operation portion 4 is different from that of Example 1.

The tables 5 to 9 store operation parameters of all the pixels. FIG. 9 explains such operation parameters. Such operation parameters will be explained taking an example of a pixel i.

It is assumed that the γ-curve for the pixel i without correction has a formed shown in FIG. 9. In the present example, it is assumed that the luminance varies linearly within ranges of gray-levels 0 to 128 and 128 to 255. Therefore, within the range of the gray-levels 0 to 128, a following relation stands between the gradation Q and the luminance L:

$$\text{gradation } Q = ai1 \times \text{luminance } L \; (ai1 \text{ being constant}) \quad (4)$$

Also within the range of the gray-levels 128 to 255, a following relation stands between the gradation Q and the luminance L:

$$\text{gradation } Q = ai2 \times \text{luminance } L + bi2 \; (ai2 \text{ and } bi2 \text{ being constants}) \quad (5)$$

Equations 4 and 5 relate to the pixel i, but linear parameters aj1, aj2, bj2 (j=1–number of all pixels) exist similarly for all the pixels, whereby the γ-curve can be represented as an articulated line as in the pixel i.

Tables 5, 6 shown in FIG. 8 store, as in Example 1, luminance data when the gray-levels 128 and 255 are inputted into the modulator and displayed. Also a table 7 stores a linear parameter aj1 (j=1–number of all pixels) of the equation 4, while a table 8 stores a linear parameter aj2 (j=1–number of all pixels) of the equation 5, and a table 9 stores a linear parameter bj2 (j=1–number of all pixels) of the equation 5.

Such luminance data may for example be obtained by a luminance measurement in a manufacturing step and written into the tables.

In the following, processing of image data will be explained, taking a pixel i as an example. Gradation data are also obtained similarly in pixels other than the pixel i.

The input-image data Qi are converted by the target γ-table 1 into a target luminance value Lit. This process is similar to that in Example 1 and is shown in FIG. 2.

The operation portion 4 compares the target luminance value Lit with luminance data Li1, Li2, and executes following processes according to a result of such comparison.

(1) Case of Lit≧Li2:

The operation portion 4 outputs 255 as gradation data, as indicated by a following equation:

$$\text{gradation data } Qi' = 255 \quad (6)$$

In case the target luminance value Lit is higher than the maximum luminance of the pixel i (luminance obtained by inputting a gray-level 255), the luminance of the pixel i cannot attain the target luminance value.

(2) Case of Li2>Lit≧Li1:

The operation portion 4 outputs, as gradation data, a value obtained by a linear interpolation of the gradations levels 128 and 255. More specifically the operation portion 4 reads out ai2, bi2 respectively from the tables 8, 9 and determines the gradation data by the following equation:

$$\text{gradation data } Qi' = ai2 \times Lit + bi2 \quad (7)$$

(3) Case of Li1>Lit≧0:

The operation portion 4 outputs, as gradation data, a value obtained by a linear interpolation of the gradations levels 0 and 128. More specifically the operation portion 4 reads ail from the table 8 and determines the gradation data by a following equation:

$$\text{gradation data } Qi' = ai1 \times Lit \quad (8)$$

In this manner, the conversion portion 2 determines a gradation to be inputted into the modulator by a linear interpolation and outputs such gradation to a modulator of the display panel.

The display panel 3 is driven by the gradation data determined in the conversion portion 2, and each pixel of the display panel 3 displays a target luminance value. Thus, there can be displayed an image corrected for the unevenness in luminance.

The present example provides an advantage that the process of the operation portion 4 is alleviated, though the memory capacity becomes larger than in Example 1.

EXAMPLE 4

Figure 10:
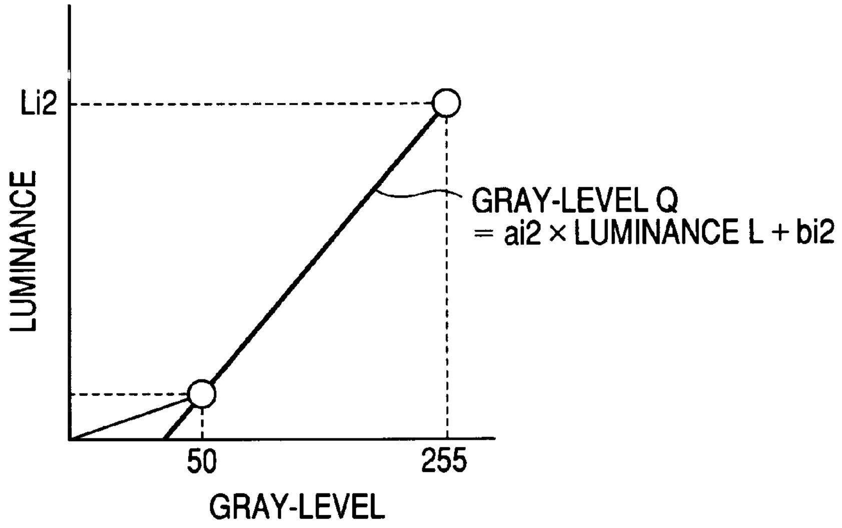
FIG. 10 is a schematic view for explaining an operation method for obtaining a gradation value to be displayed in the image display apparatus in an example 4 of the present invention.

An image display apparatus of an example 4 of the present invention will be explained with reference to FIGS. 10 and 11. This example shows a case where a bend point of a γ-curve for each pixel is present at a relatively low gray-level. The foregoing examples employ a configuration in which the pulse width extends in succession with a wave height V1, corresponding to increases in the gray-level up to a gray-level 128 as shown in FIGS. 13A to 13G. In contrast, the present example employs a configuration in which the pulse width extends in succession with a wave height V1 up to a gray-level 50 and then extends in succession with a wave height V2 thereafter. FIGS. 10 and 11 are views explaining a method of calculating the gradation value to be displayed in the image display apparatus of the example 4 of the invention.

The present example has a circuit same as that of Example 1, as shown in FIG. 1.

Input image data are converted by the target γ-table 1 into a target luminance value. A γ-curve stored in the target γ-table has γ=2.2 as shown in FIG. 2.

The target luminance value outputted from the target γ-table 1 is entered into the conversion portion 2.

FIG. 10 shows a γ-curve of a certain pixel i. Each pixel in the image display apparatus of the present example has an articulate-line γ-characteristics having a bend point at a relatively low gray-level 50 as shown in FIG. 10. In the present example, a low gradation range of a level 50 and lower is disregarded, and the unevenness in luminance is corrected utilizing the linear characteristics in the gray-levels of 50 to 255.

It is assumed that the γ-characteristics within a gradation range of levels 50 to 255 can be represented, as shown in FIG. 10, by:

$$\text{gradation } Q = ai2 \times \text{luminance L} + \text{bi2} \ (ai2 \text{ and } bi2 \text{ being constants}) \quad (9)$$

In the present example, the unevenness in luminance is corrected by the equation 9 only. A correction error is generated at the gray-level 50 and lower, but such error can be disregarded as the error is not easily detected because it is in a dark area.

In the converting portion 2, a table 5 stores the constant aj2 (j=1–number of all pixels) of the equation 9, while a table 6 stores the constant bj2 (j=1–number of all pixels) of the equation 9.

When the target luminance value Lit of the pixel i is entered into the conversion portion 2, the operation portion 4 reads out linear parameters ai2, bi2 of the pixel i from the tables 5, 6 and determines the gradation data Qi' by the following calculation:

$$\text{gradation data } Qi' = ai2 \times Lit + bi2 \quad (10)$$

Also in the present example, the operation portion 4 uses a limiter on the output in such a manner as to output 255 in case the gradation data Qi' determined by the equation 10 is larger than 255 and to output 0 in case the gradation data Qi' determined by the equation 10 is smaller than 0.

In this manner, the conversion portion 2 determines the gradation data which is the drive value to be outputted to the modulator by a linear approximation.

The display panel 3 is driven by the gradation data determined in the conversion portion 2, and each pixel of the display panel 3 displays a target luminance value, or, in a low gradation range, a value close thereto. Thus, there can be displayed an image corrected for the unevenness in luminance.

Also in the present example, linear parameters matching the γ-characteristics in the gradation range of the levels 50 to 255 are stored in the table, but the linear parameters may be those roughly approximating the γ-curve as shown in FIG. 11. In such case, correction errors are generated in a light area but the errors in a dark area can be made smaller in comparison with the case of processing with linear parameters as shown in FIG. 10.

The present example generates certain correction errors, but can reduce the processing in the correcting portion and the memory capacity.

This application claims priorities from Japanese Patent Application Nos. 2004-074633 filed on Mar. 16, 2004, and 2005-060108 filed on Mar. 4, 2005, which are hereby incorporated by reference herein.

What is claimed is:

1. An image data processing apparatus comprising:

a memory for storing plural values indicating brightnesses when a predetermined display element of plural display elements is driven based on discrete plural drive values; and an operation circuit for converting a first conversion value converted from input image data, based on a value read out from the memory thereby generating a drive value, said first conversion value indicating a target brightness, wherein the operation circuit executes an operation for evaluating a difference between the first conversion value and the value indicating brightness stored in said memory, and an operation for obtaining the drive value according to a result of the evaluation.

2. An image data processing apparatus according to claim 1, wherein the operation circuit calculates the drive value by an interior division calculation based on the result of the evaluation.

3. An image data processing apparatus according to claim 1, wherein:

the memory stores plural values indicating brightnesses when each of plural display elements is driven based on discrete plural drive values, in respective correspondence with each plural display element; and the operation circuit converts the first conversion value converted from the input image data, based on a value stored in the memory in correspondence with the predetermined display element corresponding to the input image data, thereby generating the drive value.

4. An image data processing apparatus according to claim 3, wherein:

the first conversion values are obtained by converting the input image data respectively corresponding to the plural display elements by a conversion process.

5. An image display apparatus comprising:

a display unit having display elements;

an image data processing apparatus according to claim 1; and a modulator for generating a drive pulse for driving the display elements based on a drive value outputted by the image data processing apparatus.

6. An image data processing apparatus comprising:

an operation circuit for converting a first conversion value converted from input image data and generating a drive value, said first conversion value indicating a target brightness; and a memory for storing plural values indicating brightnesses when a predetermined display element is driven based on discrete plural drive values, and an operation parameter to be used in the operation circuit for converting the first conversion value between two adjacent values among the plural values indicating brightnesses, wherein the operation circuit generates the drive value utilizing the first conversion value, one of the plural values indicating brightness and the operation parameter.

7. An image data processing apparatus according to claim 6, wherein:

the operation parameter is a value determined by a predetermined drive value and one of the plural values indicating brightness when the predetermined display element is driven with the predetermined drive value.

8. An image data processing apparatus according to claim 6, wherein:

the memory stores plural values indicating brightnesses when each of plural display elements is driven based on discrete plural drive values, in respective correspondence with each of the plural display elements, and the operation parameter corresponding to each of the plural display elements; and the operation circuit converts the first conversion value converted from the input image data, based on one of the plural values indicating brightness stored in the memory and the operation parameter, in correspondence with the predetermined display element corresponding to the input image data, thereby generating the drive value.

9. An image data processing apparatus according to claim 8, wherein:

the first conversion values are obtained by converting the input image data respectively corresponding to the plural display elements by a conversion process.

10. An image display apparatus comprising:

a display unit having display elements;

an image data processing apparatus according to claim 6; and a modulator for generating a drive pulse for driving the display elements based on a drive value outputted by the image data processing apparatus.

11. An image data processing apparatus comprising:

a memory for storing plural values indicating brightnesses when a predetermined display element is driven based on discrete plural drive values; and an operation circuit for converting an input drive value into a system drive value in which said system drive value generates a value indicating target brightness on said predetermined display element, wherein the operation circuit derives the value indicating target brightness from said input drive value, executes an operation for evaluating a difference between said value indicating said target brightness and the stored values indicating target brightnesses, and obtains said system drive value according to a result of the evaluation.

* * * * *